(12) United States Patent
Meyer et al.

(10) Patent No.: US 7,589,165 B2
(45) Date of Patent: *Sep. 15, 2009

(54) POLYCARBONATES HAVING A GOOD WETTABILITY

(75) Inventors: Alexander Meyer, Düsseldorf (DE); Wilfried Haese, Odenthal (DE); Stephan Konrad, Dormagen (DE); Claus-Ludolf Schultz, Krefeld (DE)

(73) Assignee: Bayer Material Science AG (DE)

( * ) Notice: Subject to any disclaimer, the term of this patent is extended or adjusted under 35 U.S.C. 154(b) by 93 days.

This patent is subject to a terminal disclaimer.

(21) Appl. No.: 11/312,153

(22) Filed: Dec. 20, 2005

(65) Prior Publication Data

US 2006/0135736 A1 Jun. 22, 2006

(30) Foreign Application Priority Data

Dec. 22, 2004 (DE) .................. 10 2004 061 714

(51) Int. Cl.
*C08G 64/00* (2006.01)
*C08G 63/02* (2006.01)

(52) U.S. Cl. .................. 528/196; 264/176.1; 264/219; 369/47; 369/59.11; 369/59.24; 428/411.1; 428/412; 502/150; 528/198

(58) Field of Classification Search ............ 264/176.1, 264/219; 428/411.1, 412; 528/296, 198, 528/196; 369/47, 59.11, 59.24; 502/150
See application file for complete search history.

(56) References Cited

U.S. PATENT DOCUMENTS 5,376,741 A * 12/1994 Herrig et al. ................. 526/64
5,668,202 A 9/1997 Hirata et al. ................. 524/154
5,973,102 A 10/1999 McCloskey et al. ......... 528/196
5,973,103 A * 10/1999 Silva et al. .................. 528/196
6,001,953 A * 12/1999 Davis et al. ................. 528/196
6,103,855 A 8/2000 Silva et al. .................. 528/196
6,140,457 A 10/2000 LeGrand et al. ............. 528/196
6,699,959 B2 * 3/2004 Mason et al. ............... 528/196
2002/0035234 A1 3/2002 Silva et al. .................. 528/198
2002/0151672 A1 * 10/2002 Kauth et al. ................. 528/196

FOREIGN PATENT DOCUMENTS

JP 62-207358 9/1987
JP 05214236 * 8/1993

* cited by examiner

*Primary Examiner*—Terressa M Boykin
(74) *Attorney, Agent, or Firm*—Connolly Bove Lodge & Hutz LLP

(57) ABSTRACT

Polycarbonate resin containing small amounts of carbamate compounds is disclosed. The resin that contains at least one of compounds conforming to

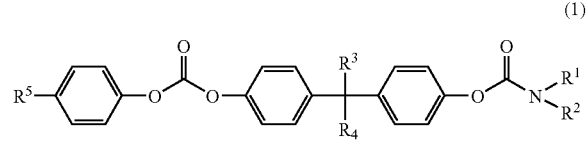

(1)

wherein
$R^1$ and $R^2$ independently of one another denote hydrogen or $C_1$-$C_{12}$-alkyl, or together denote $C_4$-$C_{12}$-alkylidene, $R^3$ and $R^4$ independently of one another represent hydrogen, $C_1$-$C_{12}$-alkyl, or phenyl, or together with the carbon atom to which they are bonded form cyclohexyl or trimethylcyclohexyl, and $R^5$ denotes hydrogen, $C_1$-$C_{12}$-alkyl, $C_5$-$C_{12}$-cycloalkyl, phenyl or cumyl, are characterized by their low electrostatic field and therefore suitable for making optical storage media.

19 Claims, No Drawings

POLYCARBONATES HAVING A GOOD WETTABILITY

FIELD OF THE INVENTION

The invention relates to thermoplastic molding compositions and more particularly to polycarbonate compositions.

BACKGROUND OF THE INVENTION

The invention provides polycarbonates as a substrate material for the production of transparent injection moldings, in particular for the production of injection moldings to be coated, and moldings obtainable from the polycarbonates according to the invention. Moldings may be e.g. transparent sheets, lenses, optical storage media or carriers for optical storage media or also articles from the field of automotive glazing, such as e.g. light-diffusing panes. The invention provides in particular optical storage media or carriers for optical storage media, such as e.g. writable optical data stores, which have a good capacity for being coated and wetting capacity and are suitable e.g. for application of dyestuffs from solution, in particular from non-polar media. Furthermore, the optical injection moldings of the polycarbonates according to the invention have a relatively low tendency to soil.

Transparent injection moldings are of importance mostly in the field of glazing and of storage media.

Optical data recording materials are increasingly being used as a variable recording and/or archiving medium for large quantities of data. Examples of this type of optical data stores are CD, super-audio CD, CD-R, CD-RW, DVD, DVD-R, DVD+R, DVD-RW, DVD+RW and BD.

Transparent thermoplastics, such as, for example, polycarbonate, polymethyl methacrylate and chemical modifications thereof, are typically employed for optical storage media. Polycarbonate as a substrate material is suitable in particular for optical disks which may be written onto once and read several times and also for optical disks which may be written onto several times, and for the production of moldings from the field of automotive glazing, such as e.g. light-diffusing panes. This thermoplastic has an excellent mechanical stability, is not very susceptible to changes in dimension and is distinguished by a high transparency and impact strength.

Polycarbonate prepared by the phase interface process may be used for the production of optical data stores of the formats described above, such as e.g. for compact disks (CD) or digital versatile disks (DVD). These disks often have the property of building up a high electrical field during their production in the injection molding process. During production of the optical data store, this high field strength on the substrate leads e.g. to attraction of dust from the environment or to sticking of the injection-molded articles, such as e.g. of the disks, to one another, which reduces the quality of the finished injection-molded articles and makes the injection molding process difficult.

It is furthermore known that the electrostatic charging, in particular of disks (for optical data carriers), leads to a deficient wettability mostly with non-polar media, such as e.g. a non-polar dyestuff, or with a dyestuff application from solvents, such as e.g. dibutyl ether, ethylcyclohexane, tetrafluoropropanol, cyclohexane, methylcyclohexane or octafluoropropanol. A high electrical field on the surface of the substrate during dyestuff application to writable data stores thus causes, for example, an irregular coating with dyestuff and therefore leads to defects in the information layer.

The extent of the electrostatic charging of a substrate material may be quantified e.g. by measurement of the electrical field at a distance from its surface.

In the case of an optical data storage medium in which a dye component is applied to the surface in a spin coating process, a low absolute electrical field strength is necessary in order to obtain uniform application of the writable layer and to attain a trouble-free production process.

Furthermore, a high electrostatic field causes losses in yield in respect of the substrate material due to the facts described above. This may lead to a halt to the particular production step and is associated with high costs.

In order to solve this problem of a high static charging, several set-ups have been pursued. In general, antistatics are added to the substrate material as additives. Antistatic polycarbonate compositions are described e.g. in JP 62 207 358-A. Here, phosphoric acid derivatives, inter alia, are added to the polycarbonate as antistatics. EP 0922 728 describes various antistatics, such as polyalkylene glycol derivatives, ethoxylated sorbitan monolaurate, polysiloxane derivatives, phosphine oxides and distearylhydroxyamine, which are employed individually or as mixtures. The Japanese Application JP 62 207 358 describes esters of phosphorous acid as additives. U.S. Pat. No. 5,668,202 describes sulfonic acid derivatives. In WO 00/50 488, 3,5-di-tert-butylphenol is employed as a chain terminator in the phase interface process. This chain terminator leads to a lower static charging of the corresponding substrate material compared with conventional chain terminators. JP 62 207 358-A describes polyethylene derivatives and polypropylene derivatives as additives for polycarbonate.

However, the additives described may also have an adverse effect on the properties of the substrate material, since they tend to migrate from the material. This is indeed a desirable effect for the antistatic properties, but may lead to formation of a deposit or defective copying. Moreover, the content of oligomers in the polycarbonate may also lead to a poorer level of mechanical properties and to a lowering of the glass transition temperature. Furthermore, these additives may cause side reactions. The subsequent "end-capping" of polycarbonate which has been obtained from the transesterification process is expensive and the results achieved are not optimum. Introduction of new end groups into the material is associated with high costs.

There is thus the object of providing a composition or a substrate material which meets the requirements of a field strength on the substrate surface which is as low as possible, and avoids the disadvantages described above.

SUMMARY OF THE INVENTION

Polycarbonate resin containing small amounts of carbamate compounds is disclosed. The resin that contains at least one of compounds conforming to

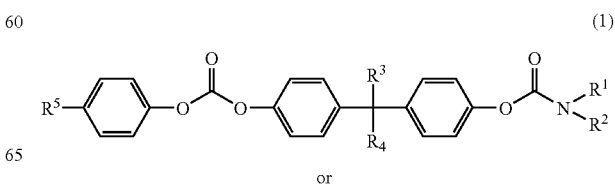

or

-continued

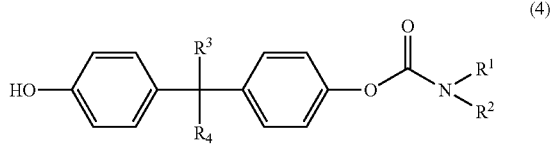

wherein
$R^1$ and $R^2$ independently of one another denote hydrogen or $C_1$-$C_{12}$-alkyl, or together denote $C_4$-$C_{12}$-alkylidene, $R^3$ and $R^4$ independently of one another represent hydrogen, $C_1$-$C_{12}$-alkyl, or phenyl, or together with the carbon atom to which they are bonded form cyclohexyl or trimethylcyclohexyl, and $R^5$ denotes hydrogen, $C_1$-$C_{12}$-alkyl, $C_5$-$CI_2$-cycloalkyl, phenyl or cumyl, are characterized by their low electrostatic field and therefore suitable for making optical storage media.

DETAILED DESCRIPTION OF THE INVENTION

Surprisingly, the object has been achieved by employing for the production of optical data storage media those materials which contain as few carbamate compounds of specific structure as possible.

Carbamate compounds present in the polycarbonate or in the substrate material are traced to the additives, contamination of precursors or the preparation process itself.

The present invention provides a polycarbonat, which contains 0.2 to 300 ppm, preferably 0.2 to 250 ppm, particularly preferably 0.2 to 200 ppm, one or more compounds conforming structurally to formula (I)

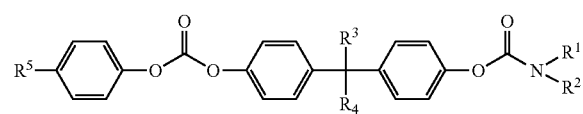

wherein
$R^1$ and $R^2$ independently of one another denote hydrogen or $C_1$-$C_{12}$-alkyl, preferably methyl, ethyl, propyl, isopropyl or butyl, or
$R^1$ and $R^2$ together denote $C_4$-$C_{12}$-alkylidene, preferably $C_4$-$C_8$-alkylidene, particularly preferably $C_4$-$C_5$-alkylidene,
$R^3$ and $R^4$ independently of one another represent hydrogen, $C_1$-$C_{12}$-alkyl, preferably $C_1$-$C_8$-alkyl, or phenyl, or $R^3$ and $R^4$ with the carbon atom to which they are bonded form cyclohexyl or trimethylcyclohexyl, and
$R^5$ denotes hydrogen, $C_1$-$C_{12}$-alkyl, $C_5$-$C_{12}$-cycloalkyl, phenyl or cumyl, preferably hydrogen, tert-butyl or cumyl,
wherein the content is measured in acetone extract by chromatography by means of HPLC.

Articles injection molded of the inventive composition, preferably optical storage media exhibit low electrostatic charging, an attribute that is important in the production of such media.

The polycarbonates/substrate materials according to the invention may be prepared by choosing suitable process parameters.

The content of compounds of the formula 1 or 4 may be influenced by several factors. For example, the purity of the educts and auxiliary substances is important. Furthermore, process parameters such as the molar ratio of bisphenol and phosgene employed, temperatures during the reaction, reaction and dwell times, may be decisive. For the person skilled in the art, the object is to control the process such that the limits according to the invention of the carbamate content in the substrate material are not exceeded.

A suitable choice of process parameters in order to obtain the desired substrate material can appear as follows:

While the excess of phosgene used, based on the total of bisphenols employed, is between 3 and 100 mol %, preferably between 5 and 50 mol %, in conventional continuous polycarbonate synthesis, the substrate material according to the invention is prepared with phosgene excesses of 5 to 20 mol %, preferably 8 to 17 mol %. In this procedure, the pH of the aqueous phase is kept in the alkaline range, preferably between 8.5 and 12, during and after metering in of the phosgene via subsequent metering in of sodium hydroxide solution once or several times or corresponding subsequent metering in of bisphenolate solution, while it is adjusted to 10 to 14 after addition of the catalyst. The temperature during the phosgenation is 0° C. to 40° C., preferably 5° C. to 36° C.

The polycarbonates according to the invention are prepared by the phase interface process. This process for the synthesis of polycarbonate is described in many cases in the literature; reference may be made by way of example to H. Schnell, Chemistry and Physics of Polycarbonates, Polymer Reviews, vol. 9, Interscience Publishers, New York 1964 p. 33 et seq., to Polymer Reviews, vol. 10, "Condensation Polymers by Interfacial and Solution Methods", Paul W. Morgan, Interscience Publishers, New York 1965, chap. VIII, p. 325, to Dres. U. Grigo, K. Kircher and P. R. Müller, "Polycarbonate" in Becker/Braun, Kunststoff-Handbuch, volume 3/1, Polycarbonate, Polyacetale, Polyester, Cellulose-ester, Carl Hanser Verlag Munich, Vienna 1992, p. 118-145 and to EP-A 0 517 044.

According to this process, the phosgenation of a disodium salt of a bisphenol (or of a mixture of various bisphenols) which has been initially introduced into an aqueous-alkaline solution (or suspension) is carried out in the presence of an inert organic solvent or solvent mixture which forms a second phase. The oligocarbonates formed, which are chiefly present in the organic phase, are subjected to a condensation reaction with the aid of suitable catalysts to give high molecular weight polycarbonates dissolved in the organic phase. Finally, the organic phase is separated off and the polycarbonate is isolated therefrom by various working up steps.

Dihydroxyaryl compounds which are suitable for the preparation of polycarbonates are those of the formula (2)

$$HO\text{-}Z\text{-}OH \qquad (2)$$

in which

Z is an aromatic radical having 6 to 30 C atoms, which may contain one or more aromatic nuclei, may be substituted and may contain aliphatic or cycloaliphatic radicals or alkylaryls or heteroatoms as bridge members.

Preferably, Z in formula (2) represents a radical of the formula (3)

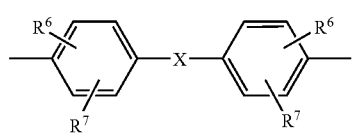

in which

R$^6$ and R$^7$ independently of one another represent H, C$_1$-C$_{18}$-alkyl, C$_1$-C$_{18}$-alkoxy, halogen, such as Cl or Br, or in each case optionally substituted aryl or aralkyl, preferably H or C$_1$-Cl$_2$-alkyl, particularly preferably H or C$_1$-C$_8$-alkyl, and very particularly preferably H or methyl, and X represents a single bond, —SO$_2$—, —CO—, —O—, —S—. C$_1$- to C$_6$-alkylene, C$_2$- to C$_5$-alkylidene or C$_5$- to C$_6$-cycloalkylidene, which may be substituted by C$_1$- to C$_6$-alkyl, preferably methyl or ethyl, and furthermore C$_6$- to C$_{12}$-arylene, which may optionally be fused with further aromatic rings containing heteroatoms.

Preferably, X represents a single bond, C$_1$ to C$_5$-alkylene, C$_2$ to C$_5$-alkylidene, C$_5$ to C$_6$-cycloalkylidene, —O—, —SO—, —CO—, —S—, —SO$_2$— or a radical of the formula (3a) or (3b)

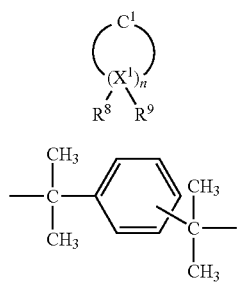

(3a)

(3b)

wherein

R$^8$ and R$^9$ may be chosen individually for each X$^1$ and independently of one another denote hydrogen or C$_1$ to C$_6$-alkyl, preferably hydrogen, methyl or ethyl, X$^1$ denotes carbon and n denotes an integer from 4 to 7, preferably 4 or 5, with the proviso that on at least one atom X$^1$, R$^8$ and R$^9$ are simultaneously alkyl.

Examples of dihydroxyaryl compounds are: dihydroxybenzenes, dihydroxydiphenyls, bis-(hydroxyphenyl)-alkanes, bis-(hydroxyphenyl)-cycloalkanes, bis-(hydroxyphenyl)-aryls, bis-(hydroxyphenyl) ethers, bis-(hydroxyphenyl) ketones, bis-(hydroxyphenyl) sulfides, bis-(hydroxyphenyl) sulfones, bis-(hydroxyphenyl) sulfoxides, 1,1'-bis-(hydroxyphenyl)-diisopropylbenzenes and compounds thereof which are alkylated on the nucleus and halogenated on the nucleus.

Aromatic dihydroxy compounds suitable for the preparation of the polycarbonates of the invention include hydroquinone, resorcinol, dihydroxydiphenyl, bis-(hydroxyphenyl)-alkanes, bis-(hydroxyphenyl)-cycloalkanes, bis-(hydroxyphenyl) sulfides, bis-(hydroxyphenyl) ethers, bis-(hydroxyphenyl) ketones, bis-(hydroxyphenyl) sulfones, bis-(hydroxyphenyl) sulfoxides, α,α'-bis-(hydroxyphenyl)-diisopropylbenzenes and compounds thereof which are alkylated, alkylated on the nucleus and halogenated on the nucleus.

Preferred diphenols are 4,4'-dihydroxydiphenyl, 2,2-bis-(4-hydroxyphenyl)-1-phenyl-propane, 1,1-bis-(4-hydroxyphenyl)-phenyl-ethane, 2,2-bis-(4-hydroxyphenyl)propane, 2,4-bis-(4-hydroxyphenyl)-2-methylbutane, 1,3-bis-[2-(4-hydroxyphenyl)-2-propyl]benzene (bisphenol M), 2,2-bis-(3-methyl-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl) sulfone, 2,4-bis-(3,5-dimethyl-4-hydroxyphenyl)-2-methylbutane, 1,3-bis-[2-(3,5-dimethyl-4-hydroxyphenyl)-2-propyl]-benzene and 1,1-bis-(4-hydroxyphenyl)-3,3,5-trimethylcyclohexane (bisphenol TMC).

Particularly preferred diphenols are 4,4'-dihydroxydiphenyl, 1,1-bis-(4-hydroxyphenyl)-phenyl-ethane, 2,2-bis-(4-hydroxyphenyl)-propane, 2,2-bis-(3,5-dimethyl-4-hydroxyphenyl)-propane, 1,1-bis-(4-hydroxyphenyl)-cyclohexane and 1,1-bis-(4-hydroxyphenyl)-3,3,5-trimethylcyclohexane (bisphenol TMC).

These and further suitable diphenols are described e.g. in U.S. Pat. Nos. 2,999,835, 3,148,172, 2,991,273, 3,271,367, 4,982,014 and 2,999,845, in the German Offenlegungsschriften 1 570 703, 2 063 050, 2 036 052, 2 211 956 and 3 832 396, French Patent Specification 1 561 518, in the monograph by H. Schnell, Chemistry and Physics of Polycarbonates, Interscience Publishers, New York 1964, p. 28 et seq.; p. 102 et seq.", and in D. G. Legrand, J. T. Bendler, Handbook of Polycarbonate Science and Technology, Marcel Dekker New York 2000, p. 72 et seq.

In the case of the homopolycarbonates, only one diphenol is employed, and in the case of copolycarbonates two or more diphenols are employed. The diphenols used, like all the other chemicals and auxiliary substances added to the synthesis, may be contaminated with the impurities originating from their own synthesis, handling and storage. However, it is desirable to work with raw materials which are as pure as possible.

The monofunctional chain terminators required for regulation of the molecular weight, such as phenol or alkylphenols, in particular phenol, p-tert-butylphenol, iso-octylphenol, cumylphenol, chlorocarbonic acid esters thereof or acid chlorides of monocarboxylic acids or mixtures of these chain terminators, either are fed to the reaction with the bisphenolate or the bisphenolates, or are added at any desired point in time of the synthesis, as long as phosgene or chlorocarbonic acid end groups are still present in the reaction mixture or, in the case of the acid chlorides and chlorocarbonic acid esters as chain terminators, as long as sufficient phenolic end groups of the polymers forming are available. Preferably, however, the chain terminator or terminators are added after the phosgenation, at a position or at a point in time when phosgene is no longer present, but the catalyst has not yet been metered in, or they are metered in before the catalyst, together with the catalyst or parallel thereto.

In the same manner, any branching agents or branching agent mixtures to be used are added to the synthesis, but conventionally before the chain terminators. Trisphenols, quaternary phenols or acid chlorides of tri- or tetracarboxylic acids are conventionally used, or also mixtures of the polyphenols or of the acid chlorides.

Examples of suitable compounds having three or more phenolic hydroxyl groups include,
phloroglucinol,
4,6-dimethyl-2,4,6-tri-(4-hydroxyphenyl)-hept-2-ene,
4,6-dimethyl-2,4,6-tri-(4-hydroxyphenyl)-heptane,
1,3,5-tri-(4-hydroxyphenyl)-benzene,
1,1,1-tri-(4-hydroxyphenyl)-ethane,
tri-(4-hydroxyphenyl)-phenylmethane,
2,2-bis-[4,4-bis-(4-hydroxyphenyl)-cyclohexyl]-propane,
2,4-bis-(4-hydroxyphenyl-isopropyl)-phenol and
tetra-(4-hydroxyphenyl)-methane.

Other suitable trifunctional compounds are 2,4-dihydroxybenzoic acid, trimesic acid, cyanuric chloride and 3,3-bis-(3-methyl-4-hydroxyphenyl)-2-oxo-2,3-dihydroindole.

Preferred branching agents are 3,3-bis-(3-methyl-4-hydroxyphenyl)-2-oxo-2,3-dihydroindole and 1,1,1-tri-(4-hydroxyphenyl)-ethane.

The catalysts used in the phase interface synthesis are tertiary amines, in particular triethylamine, tributylamine, trioctylamine, N-ethylpiperidine, N-methylpiperidine and N-i/n-propylpiperidine; quaternary ammonium salts, such as tetrabutylammonium/tributylbenzylamonium/tetraethylammonium hydroxide/chloride/bromide/hydrogen sulfate/tetrafluoroborate; and the phosphonium compounds corresponding to the ammonium compounds. These compounds are described in the literature as typical phase interface catalysts, commercially obtainable and familiar to the person skilled in the art. The catalysts may be added to the synthesis individually, in a mixture or also side by side and successively, optionally also before the phosgenation, although meterings after the introduction of phosgene are preferred, unless an onium compound or mixtures of onium compounds are used as catalysts, in which case addition before the metering in of phosgene is preferred. The metering of the catalyst or catalysts may be carried out in bulk, in an inert solvent, preferably that of the polycarbonate synthesis, or also as an aqueous solution, and in the case of the tertiary amines then as ammonium salts thereof with acids, preferably mineral acids, in particular hydrochloric acid. If several catalysts are used or part amounts of the total amount of catalyst are metered in, different methods of metering may of course also be carried out at different places or at different times. The total amount of catalysts used is between 0.001 to 10 mol %, based on the moles of bisphenols employed, preferably 0.01 to 8 mol %, particularly preferably 0.05 to 5 mol %.

The conventional additives for polycarbonates may also be added to the polycarbonates according to the invention in the conventional amounts. The addition of additives serves to prolong the duration of use or the colour (stabilizers), to simplify processing (e.g. mold release agents, flow auxiliaries, antistatic agents) or to adapt the polymer properties to particular stresses (impact modifiers, such as rubbers; flame-proofing agents, colorants, glass fibers).

These additives may be added to the polymer melt individually or in any desired mixtures or several different mixtures, and in particular directly on isolation of the polymer or after melting of granules in a so-called compounding step. In this context, the additives or mixtures thereof may be added to the polymer melt as a solid, i.e. as a powder, or as a melt. Another type of metering is the use of masterbatches or mixtures of masterbatches of the additives or additive mixtures.

Suitable additives are described, for example, in "Additives for Plastics Handbook, John Murphy, Elsevier, Oxford 1999", and in "Plastics Additives Handbook, Hans Zweifel, Hanser, Munich 2001".

Preferred heat stabilizers include organic phosphites, phosphonates and phosphanes, usually those in which the organic radicals consist entirely or partly of optionally substituted aromatic radicals. Suitable UV stabilizers include substituted benzotriazoles. These and other stabilizers may be used individually or in combinations and added to the polymer in the forms mentioned.

Furthermore, processing auxiliaries, such as mold release agents, usually derivatives of long-chain fatty acids, may be added. Pentaerythritol tetrastearate and glycerol monostearate e.g. are preferred. They are employed by themselves or in a mixture, preferably in an amount of 0.02 to 1 wt. %, based on the weight of the composition.

Suitable flame-retardant additives include phosphate esters, i.e. triphenyl phosphate, resorcinol diphosphoric acid esters, bromine-containing compounds, such as brominated phosphoric acid esters, brominated oligocarbonates and polycarbonates, and preferably salts of fluorinated organic sulfonic acids.

Suitable impact modifiers include graft polymers comprising one or more graft bases chosen from at least one polybutadiene rubber, acrylate rubber (preferably ethyl or butyl acrylate rubber), ethylene/propylene rubbers, and grafting monomers chosen from at least one monomer from the group consisting of styrene, acrylonitrile or alkyl methacrylate (preferably methyl methacrylate), or interpenetrating siloxane and acrylate networks with grafted-on methyl methacrylate or styrene/acrylonitrile.

Furthermore, colorants, such as organic dyestuffs or pigments or inorganic pigments or IR absorbers, may be added, individually, in a mixture or also in combination with stabilizers, glass fibers, glass (hollow) beads or inorganic fillers.

The polycarbonate according to the invention may moreover comprise 0.2 to 500 ppm, preferably 0.2 to 400 ppm, particularly preferably 0.2 to 300 ppm of compounds conforming to formula (4)

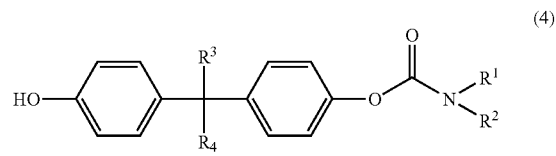

wherein $R^1$, $R^2$, $R^3$ and $R^4$ have the meaning given for formula (1), where the contents is measured by HPLC in the acetone extract after alkaline hydrolysis with sodium hydroxide solution.

The present Application furthermore provides the extrudates and moldings obtainable from the polycarbonates according to the invention, in particular those for use in the field of transparent products, very particularly in the field of optical uses, such as e.g. sheets, multi-wall sheets, glazing, diffuser panes, lamp covers or optical data stores, such as audio-CD, CD-R(W), DVD, DVD-R(W) and minidisks in their various only readable or once-writable and optionally also repeatedly writable embodiments.

The present invention furthermore provides the use of the polycarbonates according to the invention for the production of extrudates and moldings. Further uses are, for example, but without limiting the subject matter of the present invention:

1. Safety panes, which are known to be required in many areas of buildings, vehicles and aircraft, and also as visors of helmets.
2. Films
3. Blow-molded articles (see also U.S. Pat. No. 2,964,794), for example 1 to 5 gallon water bottles.
4. Transparent sheets, such as solid sheets or, in particular, hollow chamber sheets, for example for covering buildings such as railway stations, greenhouses and lighting installations.
5. Optical data stores, such as audio CDs, CD-R(W)s, DVDs, DVD-R(W)s, minidisks and the follow-up developments
6. Traffic light housings or traffic signs
7. Foams having an open or closed, optionally printable surface
8. Threads and wires (see also DE-A 11 37 167)
9. Lighting uses, optionally using glass fibers for uses in the field of translucent products
10. Translucent formulations with a content of barium sulfate and/or titanium dioxide and/or zirconium dioxide or organic polymeric acrylate rubbers (EP-A 0 634 445; EP-A 0 269 324) for the production of transparent and light-scattering moldings.
11. Precision injection moldings, such as holders, e.g. lens holders; polycarbonates are optionally used here with glass fibers and an optionally additional content of 1-10 wt. % molybdenum disulfide (based on the total molding composition).
12. Optical equipment components, in particular lenses for photographic and film cameras (DE-A 27 01 173).
13. Light transmission carriers, in particular light conductor cables (EP-A 0 089 801) and illumination cover strips
14. Electrical insulating materials for electrical conductors and for plug housings and plug connectors as well as capacitors.
15. Mobile telephone housings.
16. Network interface devices
17. Carrier materials for organic photoconductors
18. Lamps, headlamps, light-diffusing panes or internal lenses.
19. Medical uses, such as oxygenators and dialyzers.
20. Foodstuffs uses, such as bottles, utensils and chocolate molds.
21. Uses in the automobile field, such as glazing or, in the form of blends with ABS, as bumpers.
22. Sports articles, such as slalom poles, ski boot buckles.
23. Household articles, such as kitchen sinks, wash basins, letterboxes
24. Housings, such as electrical distribution boxes
25. Housings for electrical equipment, such as toothbrushes, hairdryers, coffee machines and machine tools, such as drilling, milling and planing machines and saws
26. Washing machine portholes
27. Safety glasses, sunglasses, corrective glasses and their lenses.
28. Lamp covers
29. Packaging films
30. Chip boxes, chip supports, boxes for Si wafers
31. Other uses, such as fattening stable doors or animal cages.

EXAMPLES

The method for measurement of the carbamate content in the acetone extract of polycarbonate is described in the following:

The concentration of the carbamate bisphenol A oligomer of formula (1) in the acetone extract is determined as follows:

50 mg extract are dissolved in 50 ml acetonitrile. 10 µl of the solution are injected into the HPLC. Detection is carried out with a diode array detector (DAD), fluorescence detector (FLD) or by mass spectrometry (MS) as desired. Calibration is carried out by the external standard method (multiple point calibration).

The method for measurement of the field strength on the corresponding injection molded optical disk, is as follows:

For measurement of the electrical field strength, a field meter (EMF 581320) from Eltec is used. Immediately after the end of the injection molding process, the molding (disk) is removed and deposited via a robot arm. During this procedure, the disk must not come into contact with metal, since otherwise the measurement is impaired. Furthermore, any ionizers present must be switched off.

The field meter is positioned above the disk at a distance of 100 mm from the horizontal disk surface. The center of the field meter is positioned in such a way, that its projection on the actual measured disc extends 39 mm from center of the disc. The disk is not moved during this procedure. The field is thus measured about 3 to 10 seconds after conclusion of the injection molding process.

The measuring apparatus is connected to an x/y recorder, on which the particular values are printed out. Each disk measured is thus assigned a particular integral value of the electrical field. To limit the amount of data, 100 measurements are carried out after the start of the process, i.e. the corresponding electrical field of the first 100 disks is recorded. After in each case 60 minutes, a further 100 measurements are performed. After the 4th measurement series, i.e. after approx. 3 hours, the measurement is stopped.

When carrying out the measurement it is to be ensured that the atmospheric humidity during the measurement is 30 to 60%, preferably 35 to 50%, and the room temperature is 25 to 28° C.

In this method, the electrical field on the surface of the optical disk is measured by means of a probe directly after the injection molding process. A disk is then considered difficult to be coated (e.g. dye coated) if the electrical field exceeds a value of 18 kV/m.

Example 1

Preparation of 1-(4-tert-butylphenyloxycarbonyloxy)-1'-(piperidinecarboxylic acid) 4,4'-isopropylidenediphenyl ester 9.30 g (0.025 mol) isopropylidenediphenyl bischlorocarbonate are initially introduced into 150 ml methylene chloride under argon and the mixture is cooled to 0° C. 48.49 g (0.428 mol) N-ethylpiperidine are dissolved in 20 ml methylene chloride and the solution is added dropwise to the bischlorocarbonate solution at 0° C. 3.76 g (0.025 mol) tert-butylphenol, dissolved in 10 ml methylene chloride, are then added dropwise to this solution at 0° C. The mixture is allowed to warm to room temperature and is stirred for 3 hours. Thereafter, the solvent is removed in vacuo. The residue is boiled up in 500 ml toluene and filtered off hot. On cooling, crystals precipitate out in the mother liquor. The mother liquor is filtered and concentrated (95° C., 25 mbar). 13.2 g of a highly viscous red oil are obtained. This oil is dissolved in 100 ml ethyl acetate and, after addition of 10 g silica gel (silica gel 60; 0.04-0.063 µm, Merck 109385/Lt: 948 785 203), the mixture is concentrated and introduced on to a silica gel column (column 5 cm, filling height approx. 25 cm). After chromatography with a solvent mixture of n-hexane/ethyl acetate: (9:1), 2.3 g of a vitreous solid are obtained.

$^1$H-NMR (400 MHz, CDCl$_3$) δ=7.4-7.38 (m, 2H), 7.28-7.23 (,m, 2H), 7.22-7.13 (m, 6H), 7.03-6.98 (m, 2H), 3.65-3.45 (m, 4H), 1.70-1.55 (m, 6H), 1.66 (s, 6H), 1.32 (s, 9H).

Example 2

Preparation of 1-(4-tert-butylphenyloxycarbonyloxy)-1'-(4,4'-isopropylidenediphenyl) N,N-diethylcarbamate 5.0 g (0.013 mol) isopropylidenediphenyl bischlorocarbonate are initially introduced into 100 ml methylene chloride at 0° C. under argon. 4.29 g (0.042 mol) triethylamine, dissolved in 30 ml methylene chloride, are added dropwise to this solution at 0° C. 2.02 g (0.013 mol) tert-butylphenol, dissolved in 30 ml methylene chloride, are then added dropwise. The mixture is allowed to warm to room temperature and is stirred for 3 hours. Thereafter, the solvent is removed in vacuo. The residue is boiled up in 500 ml toluene and filtered off hot.

The solvent is removed in vacuo. The crude product is chromatographed on silica gel (h: 16 cm, 5 cm, mobile phase n-hexane/EE 9:1).

2.1 g of a yellow highly viscous resin are obtained.

$^1$H-NMR (400 MHz, CDCl$_3$) δ=7.45-7.38 (m, 2H), 7.28-7.15 (m, 8H), 7.05-6.98 (m, 2H), 3.50-3.30 (m, 4H), 1.67 (s, 6H), 1.32 (s, 9H), 1.28-1.15 (m, 6H).

Example 3

Preparation of piperidinecarboxylic acid 4-[1-(4-hydroxyphenyl)-1-methylethyl]-phenyl ester 0.5 g 1-(4-tert-butylphenyloxycarbonyloxy)-1'-(piperidinecarboxylic acid) 4,4'-isopropylidenediphenyl ester are dissolved in 20 g THF, 0.5 g 32% strength sodium hydroxide solution and 5 g water are added and hydrolysis is carried out over night (min. 15 hours), while shaking.

Working Up:

The aqueous phase of the THF solution is separated off and the org. phase is concentrated. The residue is taken up in diethyl ether and the mixture is washed several times with water. The organic phase is dried over magnesium sulfate, the drying agent is filtered off and the solvent is removed in vacuo. 1.46 g of crude product are obtained and this product is chromatographed on silica gel (silica gel 60; 0.04-0.063 µm; Merck 109385/Lt: 948 785 203) with a solvent mixture of hexane/ethyl acetate (9:1) (column 5 cm, filling height approx. 25 cm). In the subsequent course, hexane/ethyl acetate (5:1) is used as the solvent mixture. 1.0 g of a white solid is obtained.

$^1$H-NMR (400 MHz, CDCl$_3$) δ=7.20-7.15 (m, 2H), 7.10-7.05 (m, 2H), 7.02-6.95 (m, 2H), 6.75-6.68 (m, 2H), 3.65-3.45 (m, 4H), 1.63 (s, 6H).

Example 4

Preparation of diethylcarbamic acid 4-[1-(4-hydroxyphenyl-1 1-methylethyl]-phenyl ester 0.5 g 1-(4-tert-butylphenyloxycarbonyloxy)-1'-(4,4'-isopropylidenediphenyl) N,N-diethylcarbamate are dissolved in 20 g THF, 0.5 g 32% strength sodium hydroxide solution and 5 g water are added and the mixture is hydrolysed over night (min. 15 hours), while shaking.

Working Up:

The aqueous phase of the THF solution is separated off and the org. phase is concentrated. The residue is taken up in diethyl ether and the mixture is washed several times with water. The organic phase is dried over magnesium sulfate, the drying agent is filtered off and the solvent is removed in vacuo. The crude product is chromatographed on silica gel (silica gel 60; 0.04-0.063 µm; Merck 109385/Lt: 948 785 203) with a solvent mixture of hexane/ethyl acetate (9:1) (column 3 cm, filling height approx. 25 cm). In the subsequent course, hexane/ethyl acetate (1:1) is used as the solvent mixture. 0.29 g of a white solid is obtained.

$^1$H-NMR (400 MHz CDCl$_3$) δ=7.26-7.22 (m, 2H), 7.12-7.08 (m, 2H), 7.04-6.98 (m, 2H), 6.72-6.68 (m, 2H), 3.55-3.35 (m, 4H), 1.67 (s, 6H), 1.35-1.15 (m, 6H).

Example 5

The preparation of the polycarbonate is carried out by the known phase interface process. It is operated by a continuous process.

The bisphenolate solution (bisphenol A; alkali content 2.12 mol NaOH/mol BPA) at 750 kg/h (14.93 wt. %), the solvent (methylene chloride/chlorobenzene 1:1) at 646 kg/h and the phosgene at 56.4 kg/h are fed into the reactor and reacted. The temperature in the reactor is 35° C. Sodium hydroxide solution (32 wt. %) at 9.97 kg/h is furthermore metered in. In the course of the condensation reaction a second amount of sodium hydroxide solution (32 wt. %) at 29.27 kg/h and a solution of chain terminators (11.7 wt. % tert-butylphenol in methylene chloride/chlorobenzene 1:1) at 34.18 kg/h are metered in. Thereafter, N-ethylpiperidine, dissolved in methylene chloride/chlorobenzene (1:1, 2.95 wt. % N-ethylpiperidine) at 33.0 kg/h is fed in as the catalyst. The phases are separated and the organic phase is washed once with dilute hydrochloric acid and five times with water. The polycarbonate solution is then concentrated, concentrated further in an evaporation vessel, and the polymer melt is spun off via a devolatilization extruder and granulated.

300 g of the polycarbonate prepared in this manner (see Table 1) are subjected to a Soxhlet extraction with 500 ml acetone (Fluka, ACS for UV spectroscopy). The extract content is approx. 5 g. 50 mg of the extract are dissolved in 50 ml acetonitrile, and 10 µl of this solution are injected into the HPLC. Detection is carried out by MS. Calibration is carried out by the external standard method (multiple point calibration) using the reference substance from Example 1.

The content of carbamate compounds of Example 1 in this polycarbonate sample is 160 mg/kg (160 ppm).

Example 6

Comparison Example

The preparation of the polycarbonate is carried out as described in Example 5. However, the bisphenolate solution (bisphenol A) at 750 kg/h (14.93 wt. %), the solvent (methylene chloride/chlorobenzene 1:1) at 646 kg/h and the phosgene at 58.25 kg/h are fed into the reactor. Sodium hydroxide solution (32 wt. %) at 12.34 kg/h is furthermore also metered in. The second amount of sodium hydroxide solution is 36.20 kg/h; the amount of chain terminator is 34.18 kg/h at the concentrations stated in Example 5. Working up is carried out as described in Example 5.

300 g of this polycarbonate (see Table 1) are subjected to a Soxhlet extraction with 500 ml acetone (Fluka ACS for UV spectroscopy). The extract content is approx. 5 g. 50 mg of the extract are dissolved in 50 ml acetonitrile, and 10 µl of this solution are injected into the HPLC. Detection is carried out by MS. Calibration is carried out by the external standard method (multiple point calibration) using the reference substance from Example 1.

The content of carbamate compounds of Example 1 in this polycarbonate sample is 600 mg/kg (600 ppm).

Example 7

The preparation of the polycarbonate is carried out by the known phase interface process. It is operated by a continuous process.

The bisphenolate solution (bisphenol A; alkali content 2.12 mol NaOH/mol BPA) at 750 kg/h (14.93 wt. %), the solvent (methylene chloride/chlorobenzene 1:1) at 646 kg/h and the phosgene at 56.4 kg/h are fed into the reactor and reacted. The temperature in the reactor is 35° C. Sodium hydroxide solution (32 wt. %) at 9.97 kg/h is furthermore metered in. In the course of the condensation reaction a second amount of sodium hydroxide solution (32 wt. %) at 29.27 kg/h and a solution of chain terminators (11.7 wt. % tert-butylphenol in methylene chloride/chlorobenzene 1:1) at 34.18 kg/h are metered in. Thereafter, N-ethylpiperidine, dissolved in methylene chloride/chlorobenzene (1:1, 2.95 wt. % N-ethylpiperidine) at 33.0 kg/h is fed in as the catalyst. The phases are separated and the organic phase is washed once with dilute hydrochloric acid and five times with water. The polycarbonate solution is then concentrated, concentrated further in an evaporation vessel, and the polymer melt is spun off via a devolatilization extruder and granulated.

300 g of the polycarbonate prepared in this manner (see Table 1) are subjected to a Soxhlet extraction with 500 ml acetone (Fluka ACS for UV spectroscopy). Approx. 5 g of extract are obtained. 50 mg of the extract are dissolved in 2 g THF, 0.19 mg 32% strength sodium hydroxide solution and 0.5 g water are added and hydrolysis is carried out over night (min. 15 h), while shaking. After the hydrolysis, the solution is acidified with hydrochloric acid and topped up to 5 ml with THF. 15 µl of the solution are injected into the HPLC. Detection is carried out by FLD.

Calibration is carried out by the external standard method (multiple point calibration) using the reference substance from Example 3.

The content of carbamate compounds of Example 3 in this polycarbonate sample is 220 mg/kg (220 ppm).

Example 8

Comparison Example

The preparation of the polycarbonate is carried out as described in Example 7. However, the bisphenolate solution (bisphenol A) at 750 kg/h (14.93 wt. %), the solvent (methylene chloride/chlorobenzene 1:1) at 646 kg/h and the phosgene at 58.25 kg/h are fed into the reactor. Sodium hydroxide solution (32 wt. %) at 12.34 kg/h is furthermore also metered in. The second amount of sodium hydroxide solution is 36.20 kg/h; the amount of chain terminator is 34.18 kg/h at the concentrations stated in Example 5. The amount of catalyst is 33 kg/h. Working up is carried out as described in Example 7.

300 g of this polycarbonate (see Table 1) are subjected to a Soxhlet extraction with 500 ml acetone (Fluka, ACS for UV spectroscopy, Germany). The extract content is approx. 5 g. 50 mg of the extract are dissolved in 2 g THF, 0.19 g 32% strength sodium hydroxide solution and 0.5 g water are added and hydrolysis is carried out over night (min. 15 h), while shaking. After the hydrolysis, the solution is acidified with hydrochloric acid and topped up to 5 ml with THF. 15 µl are injected into the HPLC. Detection is carried out by FLD.

Calibration is carried out by the external standard method (multiple point calibration) using the reference substance from Example 3.

The content of carbamate compounds of Example 3 in this polycarbonate sample is 1,200 mg/kg (1,200 ppm).

TABLE 1

| Ex. no. | Molecular weight | Tg [° C.] | Carbamate derivative of Example 3 after hydrolysis [mg/kg] | Carbamate derivative of Example 1 [mg/kg] | E field on disks after 3 h [KV/m] |
|---|---|---|---|---|---|
| 5 | 17,500 | 145 | — | 160 | <18 |
| 6 (comp.) | 17,500 | 145 | — | 600 | >18 |
| 7 | 17,500 | 145 | 220 | — | <18 |
| 8 (comp.) | 17,700 | 145 | 1,200 | — | >18 |

("comp." indicates comparative example)

As may be seen from the table, the polycarbonate according to the invention shows carbamate concentrations in the desired range and the associated good electrostatic properties.

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A polycarbonate resin produced by a continuous interfacial process wherein the resin contains
   0.2 to 300 ppm of one or more compounds conforming structurally to formula (I)

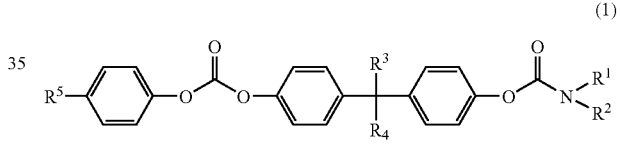

(1)

wherein
   $R^1$ and $R^2$ independently of one another denote hydrogen or $C_1$-$C_{12}$-alkyl, or together denote $C_4$-$C_{12}$-alkylidene,
   $R^3$ and $R^4$ independently of one another represent hydrogen or $C_1$-$C_{12}$-alkyl, or phenyl, or together with carbon atom to which they are bonded form cyclohexyl or trimethylcyclohexyl, and
   $R^5$ denotes hydrogen, $C_1$-$C_{12}$-alkyl, $C_5C_{12}$-cycloalkyl, phenyl or cumyl,
   wherein the content is measured in acetone extract by chromatography by means of HPLC
   wherein the process comprises reacting at least one bisphenol with an excess of 5 to 17 mol % of phosgene (based on the total of bisphenols employed) wherein the reaction has a pH is in the alkaline range and a temperature of 0 to 40° C.

2. The polycarbonate according to claim 1 wherein compounds conforming to formula (1) are present in an amount of 0.2 to 250 ppm.

3. The polycarbonate according to claim 1, wherein the content of compounds conforming to formula (1) is 0.2 to 200 ppm.

4. The polycarbonate according to claim 1, wherein, in the formula (1)
   $R^1$ and $R^2$ independently of one another represent hydrogen, methyl, ethyl, propyl or butyl, or together represent $C_4$-$C_5$-alkylidene, $R^3$ and $R^4$ independently of one another represent hydrogen, $C_1$-$C_8$-alkyl or phenyl, or together with the carbon atom to which they are bonded form cyclohexyl or trimethylcyclohexyl, and $R^5$ denotes hydrogen, tert-butyl or cumyl.

5. A molded article comprising the polycarbonate according to claim 1.

6. An injection moulding comprising the polycarbonate according to claim 1, wherein the electrostatic field, measured at a distance of 100 mm, is not more than 18 kV/m.

7. Carrier for an optical disk comprising the polycarbonate according to claim 1.

8. Optical disk comprising the polycarbonate according to claim 1.

9. A polycarbonate resin produced by a continuous interfacial process wherein the resin contains
0.2 to 500 ppm of compounds conforming to formula (4)

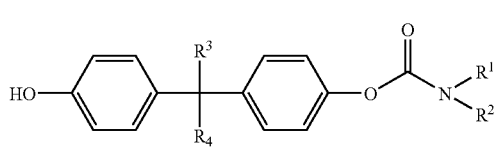

(4)

wherein
$R^1$ and $R^2$ independently of one another denote hydrogen or $C_1$—$C_{12}$-alkyl, or together denote $C_4$-$C_{12}$-alkylidene,
$R^3$ and $R^4$ independently of one another represent hydrogen or $C_1$-$C_{,2}$-alkyl, or phenyl, or together with carbon atom to which they are bonded form cyclohexyl or trimethylcyclohexyl, and
where the contents is measured by HPLC in the acetone extract after alkaline hydrolysis with sodium hydroxide solution and
wherein the process comprises reacting at least one bisphenol with an excess of 5 to 17 mol % of phosgene (based on the total of bisphenols employed).

10. The polycarbonate according to claim 3, wherein, in the formula (1)
$R^1$ and $R^2$ independently of one another represent hydrogen, methyl, ethyl, propyl or butyl, or together represent $C_4$-$C_5$-alkylidene,
$R^3$ and $R^4$ independently of one another represent hydrogen, $C_1$-$C_8$-alkyl or phenyl, or together with the carbon atom to which they are bonded form cyclohexyl or trimethylcyclohexyl, and
$R^5$ denotes hydrogen, tert-butyl or cumyl.

11. The polycarbonate as claimed in claim 1, wherein the process comprises reacting at least one bisphenol with an excess of 8 to 17 mol % of phosgene (based on the total of bisphenols employed).

12. A process to produce a polycarbonate resin containing 0.2 to 300 ppm of one or more compounds conforming structurally to formula (I)

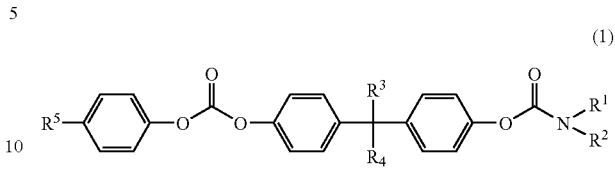

(1)

wherein
$R^1$ and $R^2$ independently of one another denote hydrogen or $C_1$-$C_{12}$-alkyl, or together denote $C_4$-$C_{12}$-alkylidene,
$R^3$ and $R^4$ independently of one another represent hydrogen or $C_1$-$C_{12}$-alkyl, or phenyl, or together with carbon atom to which they are bonded form cyclohexyl or trimethylcyclohexyl, and
$R^5$ denotes hydrogen, $C_1$-$C_{12}$-alkyl, $C_5$-$C_{12}$-cycloalkyl, phenyl or cumyl,
wherein the content is measured in acetone extract by chromatography by means of HPLC
which comprises reacting at least one bisphenol with an excess of 3 to 17 mol % of phosgene (based on the total of bisphenols employed) in a continuous phase interphase process wherein the reaction has a pH is in the alkaline range and a temperature of 0 to 40° C.

13. The process as claimed in claim 12, wherein phosgene is metered in an aqueous phase and the pH of the aqueous phase in the alkaline range from 8.5 to 12.

14. The process as claimed in claim 12, wherein the temperature during the phosgenation is 5° C. to 36° C.

15. The process as claimed in claim 13, which further comprises metering sodium hydroxide.

16. The process as claimed in claim 13, which further comprises an inert organic solvent or solvent mixture which forms a second phase.

17. The process as claimed in claim 13, which further comprises one or more catalysts wherein the total amount of catalysts used is between 0.001 to 10 mole % based on the moles of bisphenols employed.

18. The process as claimed in claim 13, which further comprises one or more catalysts wherein the total amount of catalysts used is between 0.05 to 5 mole % based on the moles of bisphenols employed.

19. The polycarbonate according to claim 9, wherein the content of compounds conforming to formula (4) is 0.2 to 300 ppm.

* * * * *